United States Patent
Todaka (10) Patent No.: US 6,973,259 B1
(45) Date of Patent: Dec. 6, 2005

(54) METHOD FOR EXTRACTING FEATURE OF BINARY IMAGE

(75) Inventor: Chiaki Todaka, Tokyo (JP)

(73) Assignee: Nippon Chemi-Con Corporation, Tokyo (JP)

(*) Notice: Subject to any disclaimer, the term of this patent is extended or adjusted under 35 U.S.C. 154(b) by 0 days.

(21) Appl. No.: 09/913,937

(22) PCT Filed: Feb. 18, 2000

(86) PCT No.: PCT/JP00/00949

§ 371 (c)(1),
(2), (4) Date: Aug. 20, 2001

(87) PCT Pub. No.: WO00/49569

PCT Pub. Date: Aug. 24, 2000

(30) Foreign Application Priority Data

Feb. 19, 1999 (JP) .................................. 11-042295

(51) Int. Cl.[7] .............................................. G06K 9/46
(52) U.S. Cl. ....................... 392/190; 382/192; 382/193; 382/194
(58) Field of Search ................................ 382/180–190, 382/191–192, 199, 201; 358/404, 444, 474

(56) References Cited

U.S. PATENT DOCUMENTS

| | | | | |
|---|---|---|---|---|
| 4,183,013 A | * | 1/1980 | Agrawala et al. | 382/173 |
| 5,748,777 A | * | 5/1998 | Katayama et al. | 382/199 |
| 6,483,942 B1 | * | 11/2002 | Curry | 382/194 |

FOREIGN PATENT DOCUMENTS

| | | |
|---|---|---|
| JP | 5-120425 | 5/1993 |
| JP | 5-258056 | 10/1993 |
| JP | 7-175925 | 7/1995 |
| JP | 7-175932 | 7/1995 |

* cited by examiner

Primary Examiner—Samir Ahmed
Assistant Examiner—Brian Le
(74) Attorney, Agent, or Firm—Young & Thompson (57) ABSTRACT

Feature quantities such as an area, a circumferential length, end points, the center of gravity, and a moment are extracted for each image area. When one of the pixel immediately preceding the detected pixel on the same line and the pixel that is on the immediately preceding line and right above the detected pixel belongs to a prescribed image area after a pixel having a prescribed density is detected in scanning one line, the area number of the image area is inherited. The processing is performed sequentially on the succeeding pixels to store resulting image data are stored in a line buffer.

20 Claims, 5 Drawing Sheets

| An → |
|---|
| IMAGE AREA EFFECTIVENESS FLAG |
| AREA |
| CIRCUMFERENTIAL LENGTH |
| TOP POINT x COORDINATE |
| TOP POINT y COORDINATE |
| BOTTOM POINT x COORDINATE |
| BOTTOM POINT y COORDINATE |
| LEFT END POINT x COORDINATE |
| LEFT END POINT y COORDINATE |
| RIGHT END POINT x COORDINATE |
| RIGHT END POINT y COORDINATE |
| SUM OF x'S |
| SUM OF y'S |
| SUM OF x*x'S |
| SUM OF y*y'S |
| SUM OF x*y'S |

| IMAGE AREA EFFECTIVENESS FLAG |
| --- |
| AREA |
| CIRCUMFERENTIAL LENGTH |
| TOP POINT x COORDINATE |
| TOP POINT y COORDINATE |
| BOTTOM POINT x COORDINATE |
| BOTTOM POINT y COORDINATE |
| LEFT END POINT x COORDINATE |
| LEFT END POINT y COORDINATE |
| RIGHT END POINT x COORDINATE |
| RIGHT END POINT y COORDINATE |
| SUM OF x'S |
| SUM OF y'S |
| SUM OF x*x'S |
| SUM OF y*y'S |
| SUM OF x*y'S |

METHOD FOR EXTRACTING FEATURE OF BINARY IMAGE

TECHNICAL FIELD

The present invention relates to a method for extracting feature quantities of image data that is used in an image processing apparatus etc. In particular, the invention relates to a binary image feature quantity extracting method capable of extracting, properly and smoothly, an area, a circumferential length, end point coordinates, coordinates of the center of gravity, a second moment, etc. of each image area by scanning binary image data once.

BACKGROUND ART

Conventionally, various methods were proposed for a means for extracting desired feature quantities from binary image data obtained by binarizing an image signal received from an imaging device such as a CCD camera.

For example, a method is known in which feature quantities such as an area, the center of gravity, and a principle axis angle are extracted in real time by preprocessing (binarizing) an image signal in the same time series as of a video signal, scanning the pixels of resulting binary data by a raster scanning method or the like, detecting an image from a "1" and "0" arrangement of the pixels, and performing various calculations such as surface integral on the pixels belonging to a region of the image.

However, in this extracting method, surface integral is performed by extracting (accessing) all pixels to extract feature quantities such as an area and hence this method includes a number of processing steps. As such, this method is not suitable for high-speed processing.

In view of the above, conventionally, a binary image feature quantity extracting apparatus was proposed having a binary image storing means for storing a binary image; an outline tracing means for obtaining, as a closed loop, position coordinates of outline pixels by tracing the outline of the binary image that is stored in the binary image storing means; and a feature quantity calculating means for extracting feature quantities relating to a figure that is enclosed by the closed loop by integrating, along the closed loop representing the outline, a monomial relating to the position coordinates of the outline pixels obtained by the outline tracing means. The outline tracing means extracts an outline of an object or the like that exists in image data and traces the outline. The feature quantity calculating means calculates a 0th moment, a first moment, etc. based on position coordinate data of the pixels that constitute the outline, and calculates an area based on the 0th moment and calculates the center of gravity of the image based on the 0th moment and the first moment. In this manner, feature quantities such as an area and the center of gravity are detected based on a small number of pixels, that is, pixel data that constitute an outline, while outline tracing (image detection) is performed.

The above conventional binary image quantity extracting apparatus extracts an outline of an image that exists in image data and traces the outline, and performs calculations such as calculating several kinds of moments based on position coordinate data of the pixels that constitute the outline, calculating an area based on a 0th moment, and calculating the center of gravity of the image based on the 0th moment and the first moment. Although the data processing amount can be reduced, the calculation processing is still complex and there are certain limits in the facilitation and the speed increase of the data processing for extracting feature quantities.

In general, the following feature quantities of image data are known.

1. Area S

Figure 8:
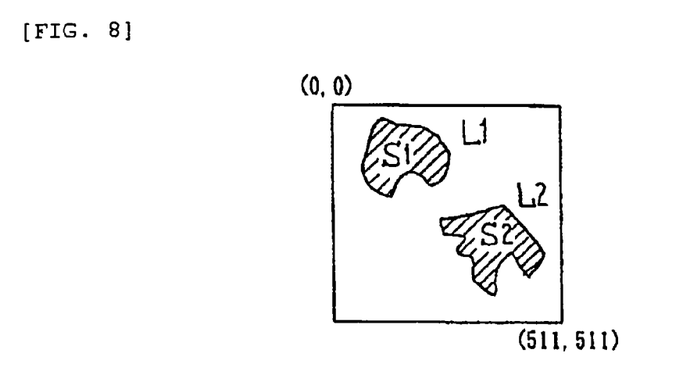
FIG. 8 is an image data explanatory diagram showing areas and circumferential lengths of respective subject image areas of image data in a binary image feature quantity extracting method.

This feature quantity can be represented by the total number of pixels of a subject image area. With this feature quantity, very small noise can be eliminated easily because it has small values. FIG. 8 shows the areas S1 and S2 of image areas A1 and A2, respectively.

2. Circumferential Length L

This feature quantity can be represented by the number of end pixels of a subject image area (four-side adjacency). Rather than used independently, its value is effective when used as a ratio to the area, that is, a feature quantity representing the degree of roundness. FIG. 8 shows the circumferential lengths L1 and L2 of the image areas A1 and A2, respectively.

3. End Point Coordinates (Top End, Bottom End, Right End, Left End)

Figure 9:
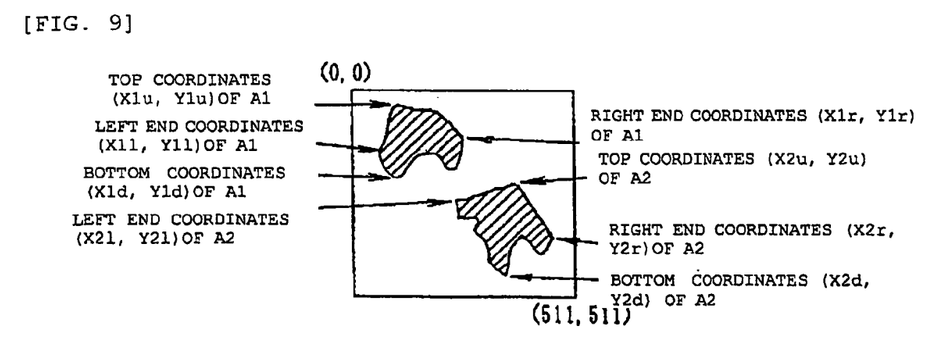
FIG. 9 is an image data explanatory diagram showing end point coordinates of subject image areas of image data in a binary image feature quantity extracting method.

These feature quantities represent the coordinates of the top end, bottom end, right end, and left end of a subject image area. Their values provide position information of the subject image area and are useful for accessing the image data directly. FIG. 9 shows top coordinates (X1$u$, Y1$u$), left end coordinates (X1$l$, Y1$l$), bottom coordinates (X1$d$, Y1$d$), and right end coordinates (X1$r$, Y1$r$) of the image area A1 and top coordinates (X2$u$, Y2$u$), left end coordinates (X2$l$, Y2$l$), bottom coordinates (X2$d$, Y2$d$), and right end coordinates (X2$r$, Y2$r$) of the image area A2.

4. Center of Gravity Coordinates

This feature quantity can be represented by center of gravity coordinates of a subject image area. These coordinate values are not necessarily located inside the subject image area. Their values can be calculated according to the following equation and serve to calculate the distance between image areas, for example.

$$X_G = \frac{1}{N}\sum_{j=1}^{N} x_j$$

$$Y_G = \frac{1}{N}\sum_{j=1}^{N} y_j$$

Figure 10:
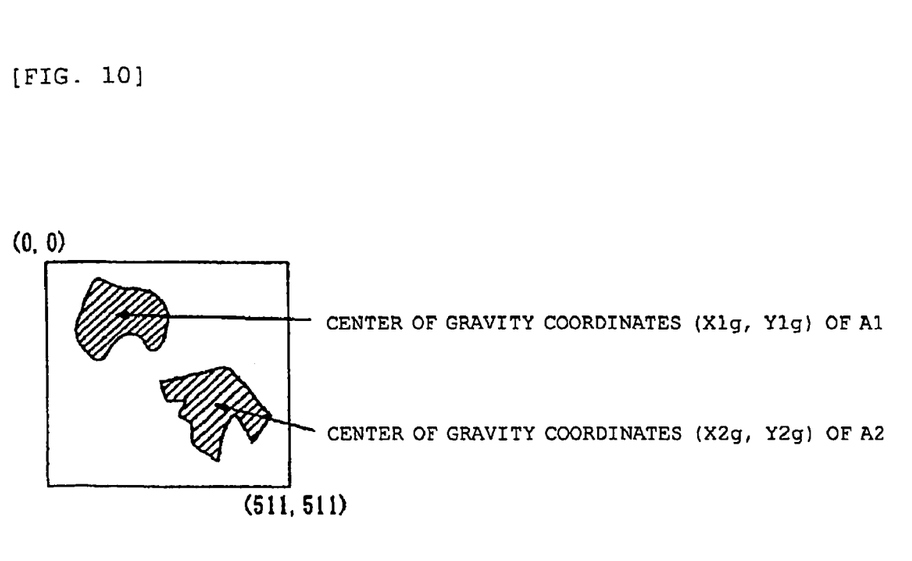
FIG. 10 is an image data explanatory diagram showing center of gravity coordinates of subject image areas of image data in a binary image feature quantity extracting method.

FIG. 10 shows center of gravity coordinates (X1$g$, Y1$g$) of the image area A1 and center of gravity coordinates (X2$g$, Y2$g$) of the image area A2.

5. Second Moment

This feature quantity can be represented by the major axis length a, minor axis length b, and angle θ of an ellipse having the same moment with calculation of a second moment of a subject image area. The values of these parameters can be calculated according to the following formulae:

$$a = 4\sqrt{\frac{4}{\pi}M_{min}\sqrt{\frac{M_{min}}{M_{max}}}}$$

-continued $$b = \sqrt{\frac{M_{max}}{M_{min}}}\, a \text{ where}$$

$$M_{max} = \text{Max}[S_{xx}\cos^2\theta_n + S_{xy}\sin 2\theta_n + S_{yy}\sin^2\theta_n]; n = 0, 1, 2, 3$$

$$M_{min} = \text{Mim}[S_{xx}\cos^2\theta_n + S_{xy}\sin 2\theta_n + S_{yy}\sin^2\theta_n]; n = 0, 1, 2, 3$$

$$\theta_n = \frac{1}{2}\left(n\pi - \text{Tan}^{-1}\frac{2S_{xy}}{S_{yy}-S_{xx}}\right) \text{ where}$$

$$S_{xx} = \sum_{i=1}^{N} x_i^2$$

$$S_{yy} = \sum_{i=1}^{N} y_i^2$$

$$S_{xy} = \sum_{i=1}^{N} x_i y_i$$

Figure 11:
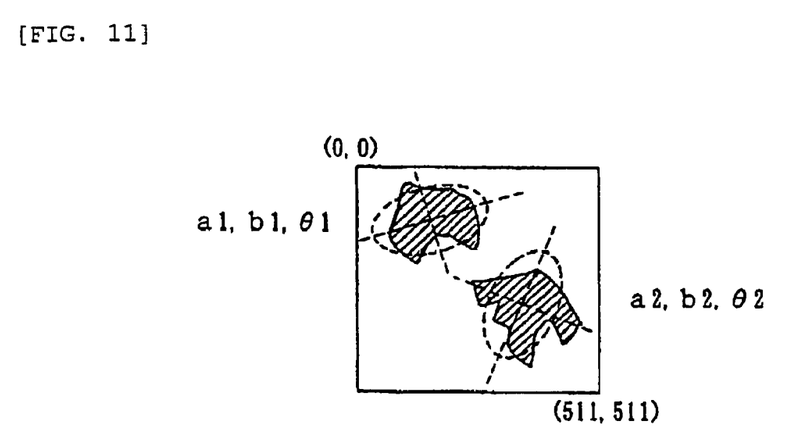
FIG. 11 is an image data explanatory diagram showing second moments of respective subject image areas of image data in a binary image feature quantity extracting method.

FIG. 11 shows a second moment (a1, b1, θ1) of the image area A1 and a second moment (a2, b2, θ2) of the image area A2.

After intensive studies and investigations, the inventor has found that an area, a circumferential length, end point coordinates, center of gravity coordinates, a second moment, etc. can be extracted properly and smoothly for each image area by the following method. That is, in extracting feature quantities such as an area, a circumferential length, end points, the center of gravity, and a moment of an image area by scanning, by a raster scanning method or the like, image data that is a binary to be displayed in one frame, setting is so made that when a pixel having a prescribed density is detected in scanning one line of the image data, the content of each of a pixel immediately preceding the detected pixel on the same line and a pixel that is on an immediately preceding line and right above the detected pixel is checked, and that an area number of the one image area is inherited when the detected pixel belongs to the same image area as one of the above pixels. The above processing is performed sequentially on the succeeding pixels to store resulting image data in a line buffer, whereby the scanning of the one line is finished. At this time, when consecutive pixels belong to respective image areas but have different area numbers after the scanning of the one line has completed, the line buffer in the reverse direction is scanned to modified the different area numbers to the same area number. Setting is so made that line scanning is performed over the entire one frame, that is, to its last line, in the same manner as performed above, whereby feature quantities are stored for each image area.

Therefore, an object of the invention is to a binary image feature quantity extracting method capable of extracting, properly and easily, necessary feature quantities of each image area by scanning binary image data once.

DISCLOSURE OF THE INVENTION

To attain the above object, the present invention provides A method for extracting feature quantities of a binary image for extracting feature quantities such as an area, a circumferential length, end points, a center of gravity, and a moment of an image area by scanning, by a raster scanning method or the like, image data that is a binary image to be displayed in one frame, characterized by comprising the steps of checking a content of each of a pixel immediately preceding the detected pixel on the same line and a pixel that is on an immediately preceding line and right above the detected pixel when a pixel having a prescribed density is detected in scanning one line of image data, inheriting an area number of the one image area when the detected pixel belongs to the same image area as one of the above pixels, performing the above processing sequentially on succeeding pixels to store resulting image data in a line buffer, scanning the line buffer in a reverse direction and modifying the different area numbers to the same area number when consecutive pixels belong to respective image areas but have different area numbers after the scanning of the one line has completed, and repeating the same line scanning to a last line of one frame to store feature quantities for each image area.

The above method may further comprise the steps of checking a content of each of a pixel immediately preceding the detected pixel on the same line and a pixel that is on an immediately preceding line and right above the detected pixel when a pixel having a prescribed density is detected in scanning one line of the image data, and inheriting an area number of the image area of the pixel right above the detected pixel with priority given to it when the detected pixel belongs to image areas of both of the above pixels.

The binary image feature quantity extracting method according to the invention, may further comprise a step of performing scanning one line of the image data to provide N pixels (N being an integer greater than or equal to 1) that follows an image area having a prescribed area number that has just terminated as semi-image areas of an adjacent image area.

The above method may further comprise a step of performing scanning one line of the image data to provide N pixels (N being an integer greater than or equal to 1) that follows an image area having the same area number that has just terminated as semi-image areas of an image area that is adjacent from right above when the image area having a prescribed area number terminated at the pixel that is located right above on an immediately preceding line.

The above method may further comprise a step of scanning the line buffer in a reverse direction and modifying the different area numbers to the common area number when consecutive pixels belong to respective image areas and semi-image areas but have different area numbers after the scanning of the one line has completed.

BEST EMBODIENT FOR CARRYING OUT THE INVENTION

Next, the best embodiment for carrying out a binary image feature quantity extracting method according to the present invention will be described in detail with reference to the accompanying drawings.

Figure 1:
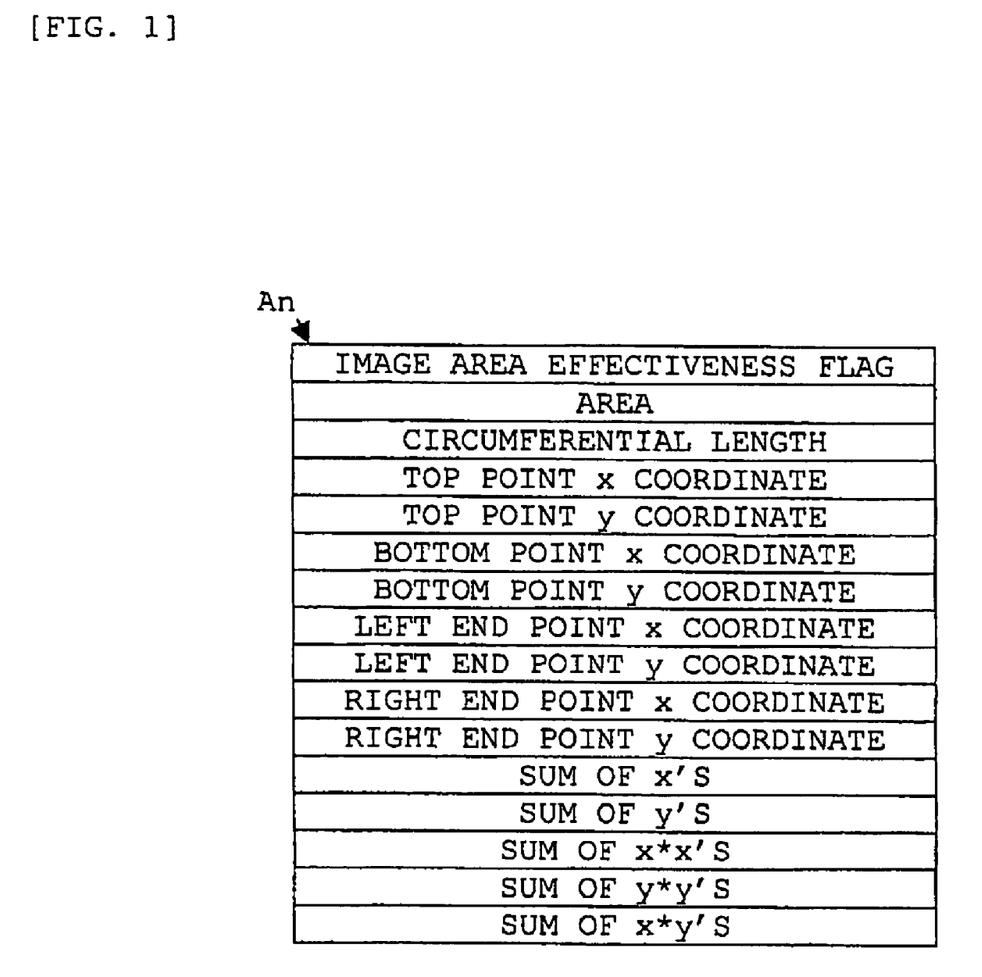
FIG. 1 is an explanatory diagram showing a data structure of feature quantities of image data on which a binary image feature quantity extracting method according to the present invention is practiced, that is, a memory format to be used for storing feature quantities of image data.

FIG. 1 shows a binary image feature quantity extracting method according to an embodiment of the invention. Specifically, FIG. 1 shows a data structure for each image area for which feature quantities should be extracted, that is, a memory format to be used for storing feature quantities of image data. In this embodiment, the feature quantities of a binary image are an area, a circumferential length, end point coordinates, center of gravity coordinates, and a second moment of each image area An.

Therefore, for an image area An shown in FIG. 1, with an image area effectiveness flag as the head, feature quantities of image data are arranged in order of an area, a circumferential length, a top point x coordinate, a top point y coordinate, a bottom point x coordinate, a bottom point y coordinate, a left end point x coordinate, a left end point y coordinate, a right end point x coordinate, a right end point y coordinate, the sum of x's, the sum of y's, the sum of x*x's, the sum of y*y's, and the sum of x*y's.

Next, a method of extracting feature quantities of a binary image will be described.

1. Data Processing Relating to Feature Quantities

When image data of one picture is line-scanned, if a black pixel (any one of an effective image area) exists at coordinates (Xj, Yj), for example, the following writing processing is performed on a memory (line buffer) and data are stored there for feature quantities of the image data:

(1) Increment the area of the image area to which the pixel belongs.
Increment the circumferential length if the pixel belongs to the boundary of the image area.
Perform replacement if the pixel is located at an end of the image area (end point coordinates).

(4) Update the sum of x's (used for calculation of center of gravity coordinates).

(5) Update the sum of y's (used for calculation of center of gravity coordinates).

(6) Update the sum of x*x's (used for calculation of a second moment).

(7) Update the sum of y*y's (used for calculation of a second moment).

(8) Update the sum of x*y's (used for calculation of a second moment).

2. Generation of Feature Quantities

Figure 2:
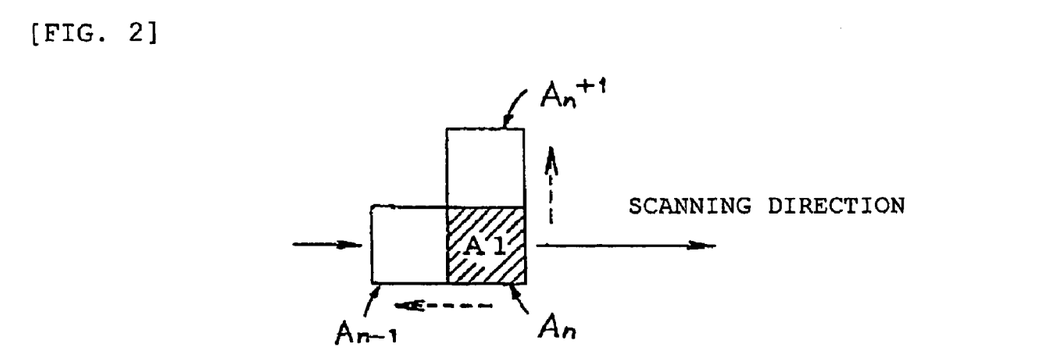
FIG. 2 is an image data explanatory diagram showing how an image area of image data is generated in the binary image feature quantity extracting method according to the invention.

In a scan of one line of image data, if a black pixel An is detected as mentioned above, as shown in FIG. 2 what image area the subject pixel An belongs to is determined by checking a pixel $An_{-1}$ that immediately precedes the pixel An on the same line and a pixel An+1 that is located on the immediately preceding line and right above the pixel An. If neither pixel has an image area, a new image area A1 is generated.

3. Inheritance of Feature Quantities

Figure 3:
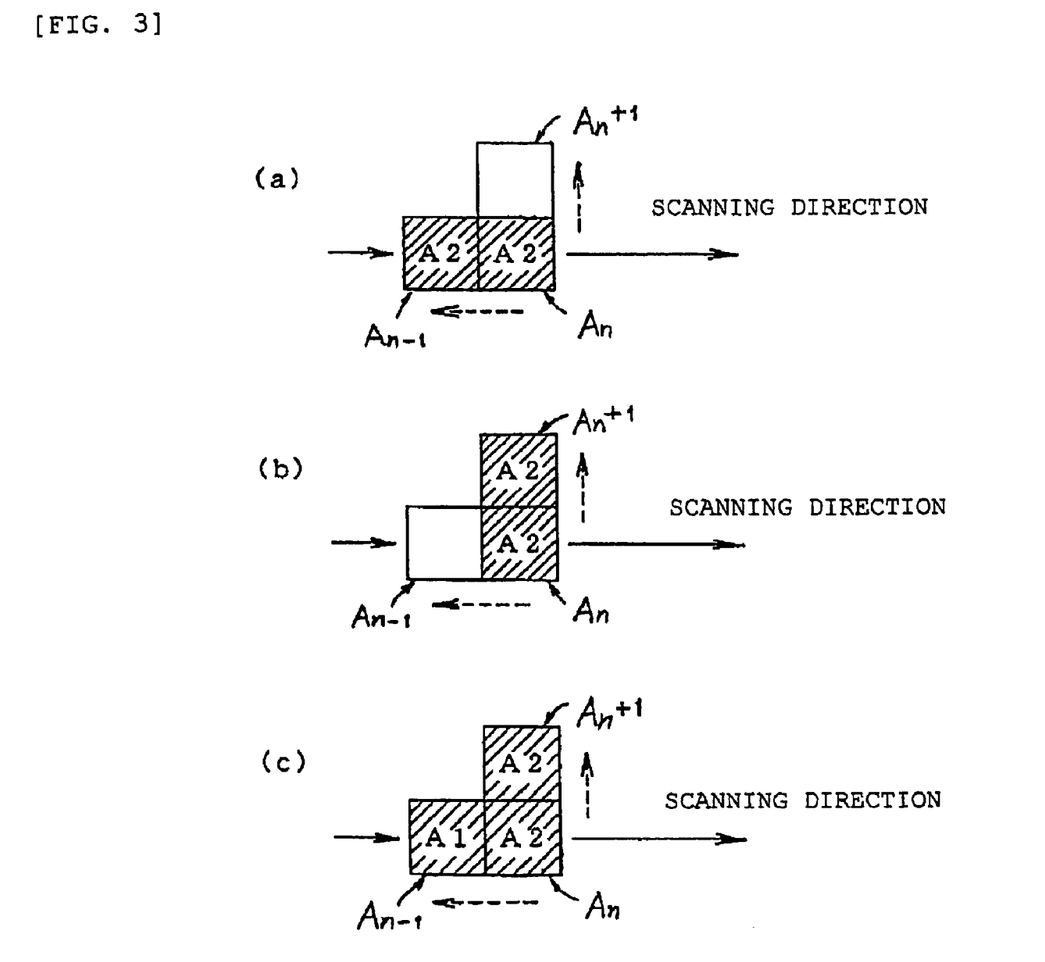
FIGS. 3(a)–3(c) are image data explanatory diagrams showing different ways an image area of image data is inherited in the binary image feature quantity extracting method according to the invention.

In a scan of one line of image data, as shown in FIGS. 3(a)–3(c), the pixel $An_{-1}$ immediately preceding the subject pixel An and/or the pixel An+1 right above the subject pixel An is checked and what image area each pixel belongs to is determined. If the pixel $An_{-1}$ immediately preceding the subject pixel An has an image area A2, the subject pixel An inherits the image area A2 at its side (see FIG. 3(a)).

If the pixel An+1 right above the subject pixel An has an image area A2, the subject pixel An inherits the image area A2 located right above (see FIG. 3(b)).

If the pixel $An_{-1}$ immediately preceding the subject pixel An and the pixel An+1 right above the subject pixel An have image areas A1 and A2, respectively, the subject pixel An inherits the image area A2 of the pixel An+1 right above the subject pixel An with priority given to it (upwardness priority; see FIG. 3(c)).

4. Combining of Feature Quantities

Figure 4:
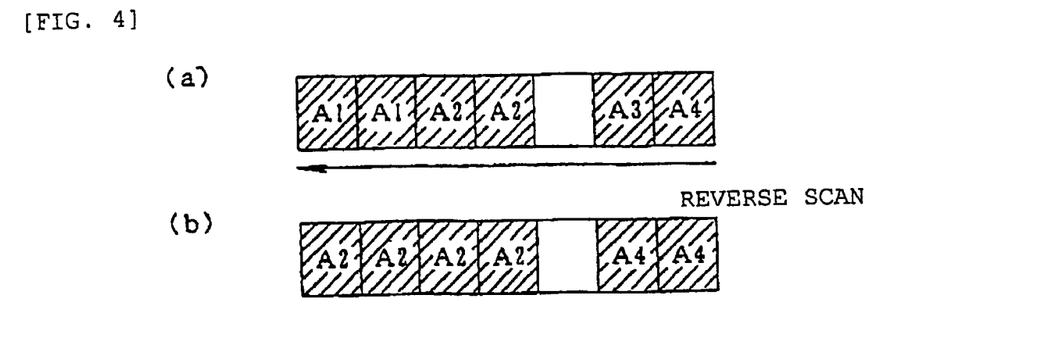
FIGS. 4(a) and 4(b) are image data explanatory diagrams showing how image areas of image data are combined with each other in the binary image feature quantity extracting method according to the invention.

When a scan of one line of image data has finished after repetition of the above-described generation and inheritance of feature quantities, there may be a case that consecutive image areas have different area numbers as shown in FIG. 4(a). In this case, to combine the image areas, the line buffer is scanned in the reverse direction. Then, as shown in FIG. 4(b), all the pixels adjacent to each other are caused to belong to the same image area A2 and the image areas to be used for the data processing for feature quantities are combined with each other. Portions that have been emptied of data are initialized and are subjected to used in the next data processing.

By performing the generation, inheritance, and combining of feature quantities for each one-line scan of the image data in the above-described manner to the last line, individual feature quantities can be stored in the memory (line buffer) according to the data structure (memory format) shown in FIG. 1 on an image area basis.

5. Connection of Feature Quantities

It is effective to regard, as belonging to the same image area, image areas that have been obtained as a result of the above processing of generation, inheritance, and combining of feature quantities and that do not satisfy the conditions of combining and distant from each other by several pixels. That is, this is necessary for image data of "dot marking," "blurring," or the like.

Specifically, two image areas that are distance from each other by N pixels, say, two pixels (N=2), are connected to each other to form the same area with the two adjacent pixels regarded as belong to respective semi-image areas. This connection technique is used in the same manner as the above processing of generation, inheritance, and combining of feature quantities.

(a) Generation of Connected Image Area

Figure 5:
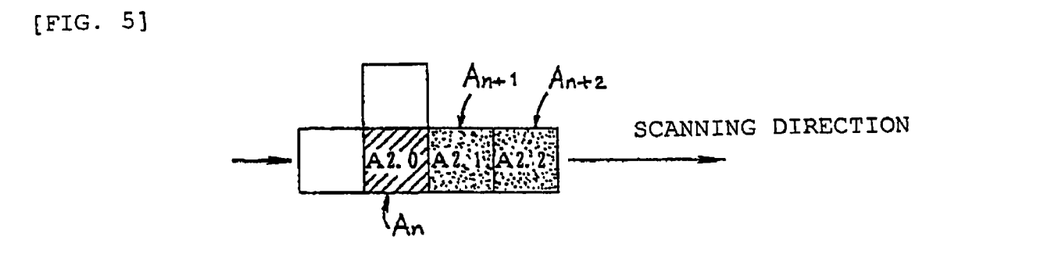
FIG. 5 is an image data explanatory diagram showing how a connection image area of image data is generated in the binary image feature quantity extracting method according to the invention.

As shown in FIG. 5, after generation of an image area A2.0 at a subject pixel An, semi-image areas A2.1 and A2.2 (N=2) are generated at the two following pixels $An_{+1}$ and $An_{+2}$ and distance information is stored in the line buffer together with the information of the image area A2.0.

(b) Inheritance of Connected Image Area

Figure 6:
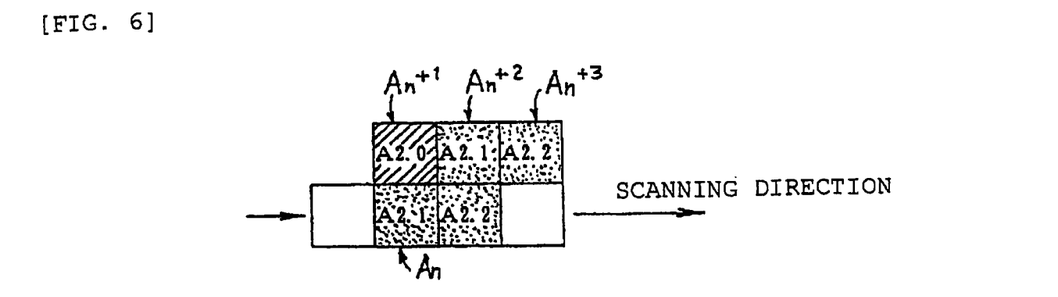
FIG. 6 is an image data explanatory diagram showing how a connected image area of image data is inherited in the binary image feature quantity extracting method according to the invention.

Similarly, if the pixel An+1 right above a subject pixel An has an image area A2.0, inheritance is made with semi-image areas A2.1 and A2.2 generated at two pixels adjacent to each other, that is, the subject pixel An and the immediately following pixel $An_{+1}$, respectively.

(c) Combining of Connected Image Areas

Figure 7:
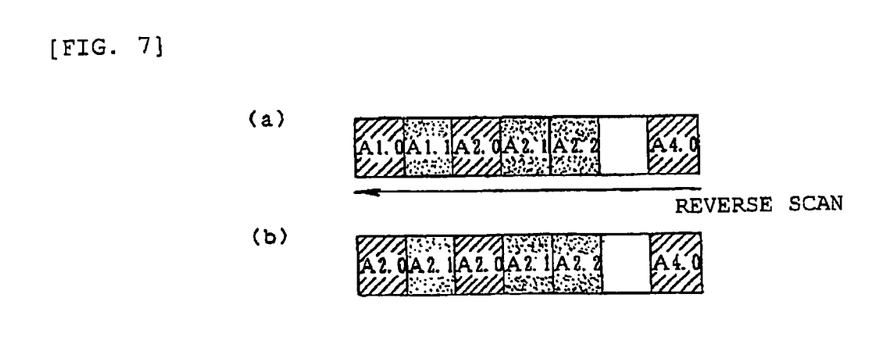
FIGS. 7(a) and 7(b) are image data explanatory diagrams showing how connected image areas of image data are combined with each other in the binary image feature quantity extracting method according to the invention.

If consecutive image areas have different area numbers as shown in FIG. 7(a), the line buffer is scanned in the reverse direction and adjacent pixels are caused to belong to the same area (or its semi-image areas) as shown in FIG. 7(b).

Therefore, the above-described binary image feature quantity extracting method according to the invention makes it possible to extract, properly and smoothly, feature quantities that are an area, a circumferential length, end point coordinates, center of gravity coordinates, and a second moment of each image area based on data relating to feature quantities that have been extracted for the image area.

Although the best embodiment for carrying out the embodiment has been described above, the invention is not limited to the above embodiment and various design modifications are possible without departing from the spirit and scope of the invention.

INDUSTRIAL APPLICABILITY

The invention provides a method for extracting feature quantities of a binary image for extracting feature quantities such as an area, a circumferential length, end points, a center of gravity, and a moment of an image area by scanning, by a raster scanning method or the like, image data that is a binary image to be displayed in one frame, characterized by comprising the steps of checking a content of each of a pixel immediately preceding the detected pixel on the same line and a pixel that is on an immediately preceding line and right above the detected pixel when a pixel having a prescribed density is detected in scanning one line of image data, inheriting an area number of the one image area when the detected pixel belongs to the same image area as one of the above pixels, performing the above processing sequentially on succeeding pixels to store resulting image data in a line buffer, scanning the line buffer in a reverse direction and modifying the different area numbers to the same area number when consecutive pixels belong to respective image areas but have different area numbers after the scanning of the one line has completed, and repeating the same line scanning to a last line of one frame to store feature quantities for each image area. In this manner, an area, a circumferential length, end point coordinates, center of gravity coordinates, a second moment, etc. can be extracted properly and smoothly for each image area by scanning binary image data once.

What is claimed is:

1. A method for extracting feature quantities of a binary image by scanning, image data that is a binary image to be displayed in one frame, comprising the steps of:
    A) in scanning one line of image data, when a detected pixel has a prescribed density, checking an image area content of each of a first pixel immediately preceding the detected pixel on the one line and a content of a second pixel that is on an immediately preceding line and right above the detected pixel to determine, based on the image area content, if the detected pixel belongs to an image area of the first pixel or an image area of the second pixel;
    B) when the detected pixel belongs to the image area of the first pixel or the image area of the second pixel, having the detected pixel inherit an area number of the image area of the first pixel and the second pixel to which the detected pixel was determined to belong;
    C) performing the above processing steps A)–B) sequentially on succeeding pixels to store resulting image data in a line buffer;
    D) after the scanning of the one line has been completed, scanning the line buffer in a reverse direction and modifying the image area content of consecutive pixels having different area numbers to have a same area number when the consecutive pixels belong to respective image areas but have different area numbers; and
    E) repeating the line scanning of steps A)–D) to a last line of one frame to store feature quantities for each image area.

2. A method for extracting feature quantities of a binary image according to claim 1, comprising the steps of:
    when step A) determines that the detected pixel belongs to both the image area of the first pixel and the image area of the second pixel, having the detected pixel inherit the area number of the image area of the second pixel right above the detected pixel, the first pixel and the second pixel belonging to different image areas.

3. A method for extracting feature quantities of a binary image according to claim 1, further comprising a step of, after step B), performing scanning of the one line of the image data to identify N pixels (N being an integer greater than or equal to 1) that follows a first image area having a prescribed first area number that has just terminated, the N pixels forming semi-image areas adjacent the first image area.

4. A method for extracting feature quantities of a binary image according to claim 1, further comprising a step of performing, after step B), scanning one line of the image data, on the immediately preceding line, to identify N pixels (N being an integer greater than or equal to 1) that follows an image area having the same area number that has just terminated as semi-image areas of an image area that is adjacent from right above when the image area having a prescribed area number terminated at the pixel that is located right above on immediately preceding line.

5. A method for extracting feature quantities of a binary image further comprising a step of scanning, after the scanning of the one line has completed according to claim 3, the line buffer in a reverse direction and modifying the different area numbers to a common area number when identifying consecutive pixels belong to respective image areas and semi-image areas but have having different area numbers.

6. A method for extracting feature quantities of a binary image according to claim 2, further comprising a step of, after step B), performing scanning of the one line of the image data to identify N pixels (N being an integer greater than or equal to 1) that follows a first image area having a prescribed first area number that has just terminated, the N pixels forming semi-image areas adjacent the first image area.

7. A method for extracting feature quantities of a binary image according to claim 2, further comprising a step of performing, after step B), scanning one line of the image data, on the immediately preceding line, to identify N pixels (N being an integer greater than or equal to 1) that follows an image area having the same area number that has just terminated as semi-image areas of an image area that is adjacent from right above when the image area having a prescribed area number terminated at the pixel that is located right above on immediately preceding line.

8. A method for extracting feature quantities of a binary image further comprising a step of scanning, after the scanning of the one line has completed according to claim 4, the line buffer in a reverse direction and modifying the different area numbers to a common area number when identifying consecutive pixels belong to respective image areas and semi-image areas but having different area numbers.

9. The method for extracting feature quantities of a binary image of claim 1, wherein, the feature quantities are an area, a circumferential length, end points, a center of gravity, and a moment of an image area.

10. The method for extracting feature quantities of a binary image of claim 1, wherein, the scanning is a raster scanning method.

11. A method for extracting feature quantities of a binary image by scanning, image data that is a binary image to be displayed in one frame, comprising the steps of:

A) scanning one line of image data, when a detected pixel has a prescribed density, checking an image area content of only each of a first pixel immediately preceding the detected pixel on the one line and a content of a second pixel that is on an immediately preceding line and right above the detected pixel to determine, based on the image area content, if the detected pixel belongs to a first image area of the first pixel or a second image area of the second pixel;

B) when the detected pixel belongs to one of the first and second image areas, having the detected pixel inherit an area number of one of the first and second image areas to which the detected pixel was determined to belong;

C) performing the above processing steps A)–B) sequentially on succeeding pixels to store resulting image data in a line buffer;

D) after the scanning of the one line has been completed, scanning the line buffer in a reverse direction and modifying the image area content of consecutive pixels having different area numbers to have a same area number when the consecutive pixels belong to respective image areas but have different area numbers; and E) repeating the line scanning of steps A)–D) to a last line of one frame to store feature quantities for each image area.

12. A method for extracting feature quantities of a binary image according to claim 1, comprising the further step of:

when step A) determines that the detected pixel belongs to both the first image area of the first pixel and the second image area of the second pixel, having the detected pixel inherit the area number of the second image area of the second pixel right above the detected pixel.

13. A method for extracting feature quantities of a binary image according to claim 11, further comprising a step of, after step B), performing scanning of the one line of the image data to identify N pixels (N being an integer greater than or equal to 1) that follows a just-terminated image area having a prescribed area number that has just terminated, the N pixels forming semi-image areas adjacent the just-terminated image area.

14. A method for extracting feature quantities of a binary image according to claim 11, further comprising a step of performing, after step B), scanning one line of the image data, on the immediately preceding line, to identify N pixels (N being an integer greater than or equal to 1) that follows an image area having the same area number that has just terminated as semi-image areas of an image area that is adjacent from right above when the image area having a prescribed area number terminated at the pixel that is located right above on immediately preceding line.

15. A method for extracting feature quantities of a binary image further comprising a step of scanning, after the scanning of the one line has completed according to claim 13, the line buffer in a reverse direction and modifying the different area numbers to a common area number when identifying consecutive pixels belong to respective image areas and semi-image areas but having different area numbers.

16. A method for extracting feature quantities of a binary image according to claim 12, further comprising a step of, after step B), performing scanning of the one line of the image data to identify N pixels (N being an integer greater than or equal to 1) that follows a just-terminated image area having a prescribed first area number that has just terminated, the N pixels forming semi-image areas adjacent the just-terminated image area.

17. A method for extracting feature quantities of a binary image according to claim 12, further comprising a step of performing, after step B), scanning one line of the image data, on the immediately preceding line, to identify N pixels (N being an integer greater than or equal to 1) that follows an image area having the same area number that has just terminated as semi-image areas of an image area that is adjacent from right above when the image area having a prescribed area number terminated at the pixel that is located right above on immediately preceding line.

18. A method for extracting feature quantities of a binary image further comprising a step of scanning, after the scanning of the one line has completed according to claim 14, the line buffer in a reverse direction and modifying the different area numbers to a common area number when identifying consecutive pixels belong to respective image areas and semi-image areas but having different area numbers.

19. The method for extracting feature quantities of a binary image of claim 11, wherein, the feature quantities are an area, a circumferential length, end points, a center of gravity, and a moment of an image area.

20. The method for extracting feature quantities of a binary image of claim 1, wherein, the scanning is a raster scanning method.

* * * * *